US010960921B2

(12) United States Patent
Otto et al.

(10) Patent No.: US 10,960,921 B2
(45) Date of Patent: Mar. 30, 2021

(54) LASH DETECTION STARTUP DIAGNOSTIC

(71) Applicant: STEERING SOLUTIONS IP HOLDING CORPORATION, Saginaw, MI (US)

(72) Inventors: Jeffrey M Otto, Auburn, MI (US); Rangarajan Ramanujam, Saginaw, MI (US); Bhuvanesh Sainath, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 267 days.

(21) Appl. No.: 15/994,209

(22) Filed: May 31, 2018

(65) Prior Publication Data
US 2018/0346016 A1    Dec. 6, 2018

Related U.S. Application Data

(60) Provisional application No. 62/512,978, filed on May 31, 2017.

(51) Int. Cl.
| | | |
|---|---|---|
| *B62D 5/04* | (2006.01) | |
| *G07C 5/08* | (2006.01) | |
| *F16H 25/22* | (2006.01) | |

(52) U.S. Cl.
CPC ......... *B62D 5/0481* (2013.01); *G07C 5/0808* (2013.01); *B62D 5/0424* (2013.01); *B62D 5/0448* (2013.01); *F16H 25/2204* (2013.01)

(58) Field of Classification Search
CPC .. B62D 5/0481; B62D 5/0448; B62D 5/0424; G07C 5/0808; F16H 25/2204; G01B 21/16

USPC .................................................. 701/32.8
See application file for complete search history.

(56) References Cited

U.S. PATENT DOCUMENTS

| | | | | |
|---|---|---|---|---|
| 4,509,775 | A * | 4/1985 | Arndt .................. | B25B 27/304 267/170 |
| 5,847,534 | A * | 12/1998 | Tanamachi ............ | B60L 3/10 318/801 |
| 6,271,637 | B1 | 8/2001 | Kushion | |
| 9,092,093 | B2 * | 7/2015 | Jubner .................. | B62D 1/046 |

(Continued)

FOREIGN PATENT DOCUMENTS

JP    H10260858    9/1998

OTHER PUBLICATIONS

Chinese Office Action issued from China National Intellectual Property Administration (CNIPA) dated Jun. 30, 2020 for related Chinese Application No. 2018105529378, 10 pages, English Translation Included.

*Primary Examiner* — Jonathan M Dager
*Assistant Examiner* — Jean W Charleston
(74) *Attorney, Agent, or Firm* — Dickinson Wright PLLC

(57) ABSTRACT

Technical solutions are described for lash detection diagnostic in a steering system. An example method includes sending, by a controller, an excitation motor command to a motor control system. The method further includes measuring, by the controller, a sensor signal generated in response to the excitation motor command. The method further includes determining, by the controller, a decay rate of a change in magnitude of the signal at a plurality of frequencies. The method further includes diagnosing, by the controller, that the steering system has a lash condition based on the decay rate exceeding a predetermined threshold.

20 Claims, 7 Drawing Sheets

(56) References Cited

U.S. PATENT DOCUMENTS

| | | | | |
|---|---|---|---|---|
| 2004/0154422 A1* | 8/2004 | Menjak | ............... | F16D 1/104 |
| | | | | 74/440 |
| 2004/0262063 A1* | 12/2004 | Kaufmann | ............ | B62D 15/029 |
| | | | | 180/169 |
| 2010/0127857 A1* | 5/2010 | Kilmurray | ............ | G06F 1/3287 |
| | | | | 340/540 |
| 2010/0168967 A1* | 7/2010 | Dlugoss | .......... | B60W 30/18054 |
| | | | | 701/49 |
| 2012/0097474 A1* | 4/2012 | Setsuda | ............... | B62D 5/0409 |
| | | | | 180/444 |
| 2013/0073145 A1* | 3/2013 | Kobayashi | ............ | B60W 10/18 |
| | | | | 701/37 |
| 2013/0096778 A1* | 4/2013 | Goto | ..................... | B62D 6/002 |
| | | | | 701/41 |
| 2013/0191003 A1* | 7/2013 | Hahne | .................. | B60W 30/17 |
| | | | | 70/199 |
| 2015/0203148 A1* | 7/2015 | Kuramitsu | ............. | G06F 17/11 |
| | | | | 701/41 |
| 2016/0231743 A1* | 8/2016 | Bendewald | ........... | B60W 30/16 |
| 2016/0362117 A1* | 12/2016 | Kaufmann | ........... | B60W 50/10 |
| 2016/0375770 A1* | 12/2016 | Ryne | ..................... | B60K 35/00 |
| | | | | 701/23 |
| 2017/0151975 A1* | 6/2017 | Schmidt | ................ | B62D 1/183 |
| 2017/0166249 A1* | 6/2017 | Birsching | .............. | B62D 5/065 |
| 2018/0201156 A1* | 7/2018 | Mangette | ........... | B66F 9/07572 |

\* cited by examiner

| On the Road<br>Driver Assistance | Around the Corner<br>Partial / Conditional Automation | | Down the Road<br>High / Full Automation | |
|---|---|---|---|---|
| LEVEL 1 | LEVEL 2 | LEVEL 3 | LEVEL 4 | LEVEL 5 |
| Electric Power Steering | Electric Power Steering+ | Steer-by-Wire / Active Front | Stow-able Wheel | No Steering Wheel |
| • Fail Safe EPS<br>• Controls, Safety & Interfaces to Level 1 Features (e.g., Advanced Park Assist, Lane Keeping Assist, Lane Departure Warnings, etc.) | • Redundant Hardware & Software<br>• Fail Operational for Hands-Free Driving<br>• Smooth Transitions Between Hands On/Off the Wheel | • Decouples Steering Wheel & Road Wheels<br>• Optimizes Under-Hood Space<br>• Enables a "Quiet Wheel," Sense of Security<br>• Enhanced Vehicle Packaging, Flexibility & Crashworthiness | • Retracts Column, Provides Additional Cockpit Space<br>• Smooth Transitions Between Stowed & Un-Stowed States<br>• Manual Un-Stow Override Capable | • No Steering Column or I-Shaft<br>• Provides Modular Platform Architecture (Easily Customized for Different Market Needs)<br>• Emergency Remote Control Option |

FIG. 1

| | | | | | |
|---|---|---|---|---|---|
| SAE | No Automation (Level 0) | Driver Assistance (Level 1) | Partial Automation (Level 2) | Conditional Automation (Level 3) | High Automation (Level 3) | Full Automation (Level 5) |
| BASt | Driver Only | Assisted | Partly Automated | Highly Automated | Fully Automated | (not addressed) |
| NHTSA | No Automation (Level 0) | Function Specific Automation (Level 1) | Combined Function Automation (Level 2) | Limited Self-Driving Automation (Level 3) | Full Self-Driving Automation (Level 4) | |

FIG. 2

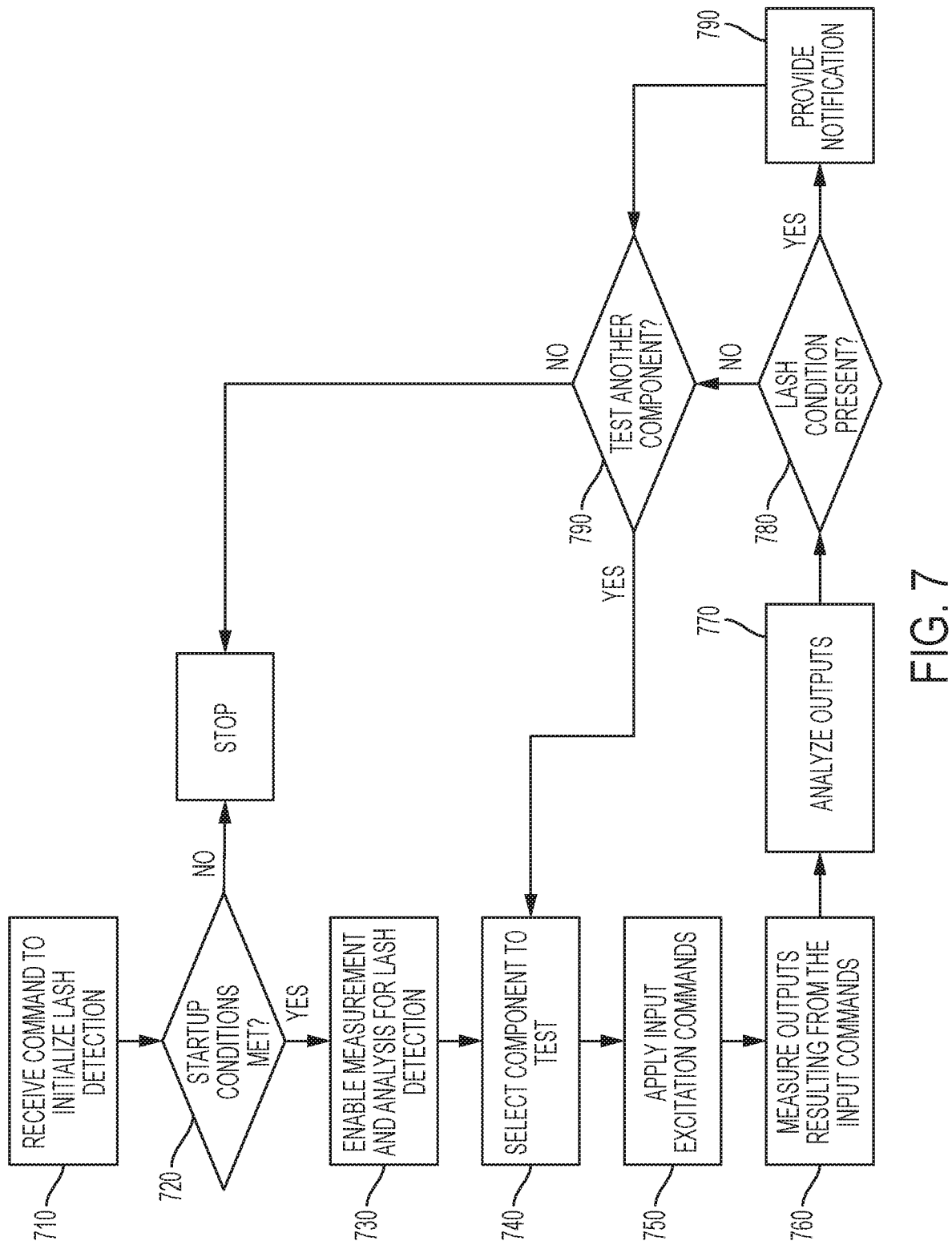

LASH DETECTION STARTUP DIAGNOSTIC

This patent application claims priority to U.S. Provisional Patent Application Ser. No. 62/512,978 filed May 31, 2017, which is incorporated herein by reference in its entirety.

BACKGROUND

The present disclosure is generally related to electric power steering systems (EPS), and particularly to lash detection and startup diagnostic for EPS used in vehicles equipped with advanced driver assist systems for automated vehicle operation.

As Advanced Driver Assist Systems (ADAS) transform the auto-industry, EPS has to adapt to accommodate that market segment. ADAS can operate in different use cases that are generally classified by the Society of Automotive Engineers into different categories, such as Level 3, Level 4, etc, the levels being those determined by the standards agreed upon by the SAE as the SAE J3016 standards related to on-road motor vehicle automated driving systems.

SUMMARY

Technical solutions are described for lash detection diagnostic in a steering system. An example method includes sending, by a controller, an excitation motor command to a motor control system. The method further includes measuring, by the controller, a sensor signal generated in response to the excitation motor command. The method further includes determining, by the controller, a decay rate of a change in magnitude of the signal at a plurality of frequencies. The method further includes diagnosing, by the controller, that the steering system has a lash condition based on the decay rate exceeding a predetermined threshold.

According to one or more embodiments, steering system includes a motor control system, and a lash detection module that detects presence of a lash condition in the steering system. Detecting the lash condition includes sending an excitation motor command to a motor control system, and measuring a sensor signal generated in response to the excitation motor command. Detecting the lash condition further includes determining a decay rate of a change in magnitude of the sensor signal at a plurality of frequencies, and diagnosing that the steering system has a lash condition based on the decay rate exceeding a predetermined threshold.

According to one or more embodiments, a lash detection system that detects presence of a lash condition in a steering system includes a measurement module that sends an excitation motor command to a motor control system of the steering system, and measures a sensor signal generated in response to the excitation motor command. The lash detection system further includes a classification module that determines a decay rate of a change in magnitude of the sensor signal at a plurality of frequencies, and diagnoses that the steering system has a lash condition based on the decay rate exceeding a predetermined threshold.

These and other advantages and features will become more apparent from the following description taken in conjunction with the drawings.

BRIEF DESCRIPTION OF THE DRAWINGS

FIG. 1 depicts example levels determined in the SAE J3016 standards;

FIG. 2 illustrates a comparison between the levels in such standards;

FIG. 7 depicts a flowchart of an example method for lash detection in an EPS according to one or more embodiments.

DETAILED DESCRIPTION

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

FIG. 1 depicts example levels determined in the SAE J3016 standards. It should be noted that although the current document refers to the SAE standards and terms, the technical solutions herein are applicable to vehicles that use other standards such as Federal Highway Research Institute (BASt) and National Highway Traffic Safety Administration (NHTSA) standards that address similar cases as the SAE standards possibly using different terms. For example, FIG. 2 illustrates a comparison between the levels in such standards.

The technical solutions described herein provide a lash detection startup diagnostic that facilitates replacing the functionality of driver observed EPS steering lash that no longer is present in an ADAS vehicle operating in SAE Level 3+ use case. As noted in FIG. 1, in SAE Level 3+, the vehicle may operate in an automated manner without a human driver having to hold a steering wheel. Accordingly, tactile feedback provided to the human driver via the steering wheel, for the human driver to detect a fault with the steering system (or any other component of the vehicle) may not can no longer be used as a fault/condition notification or warning, which is a prevalent practice in Level 2 and below. Particularly, the technical solutions described herein facilitate detecting a lash condition in one or more mechanical components, such as those of the steering system.

Figure 3:
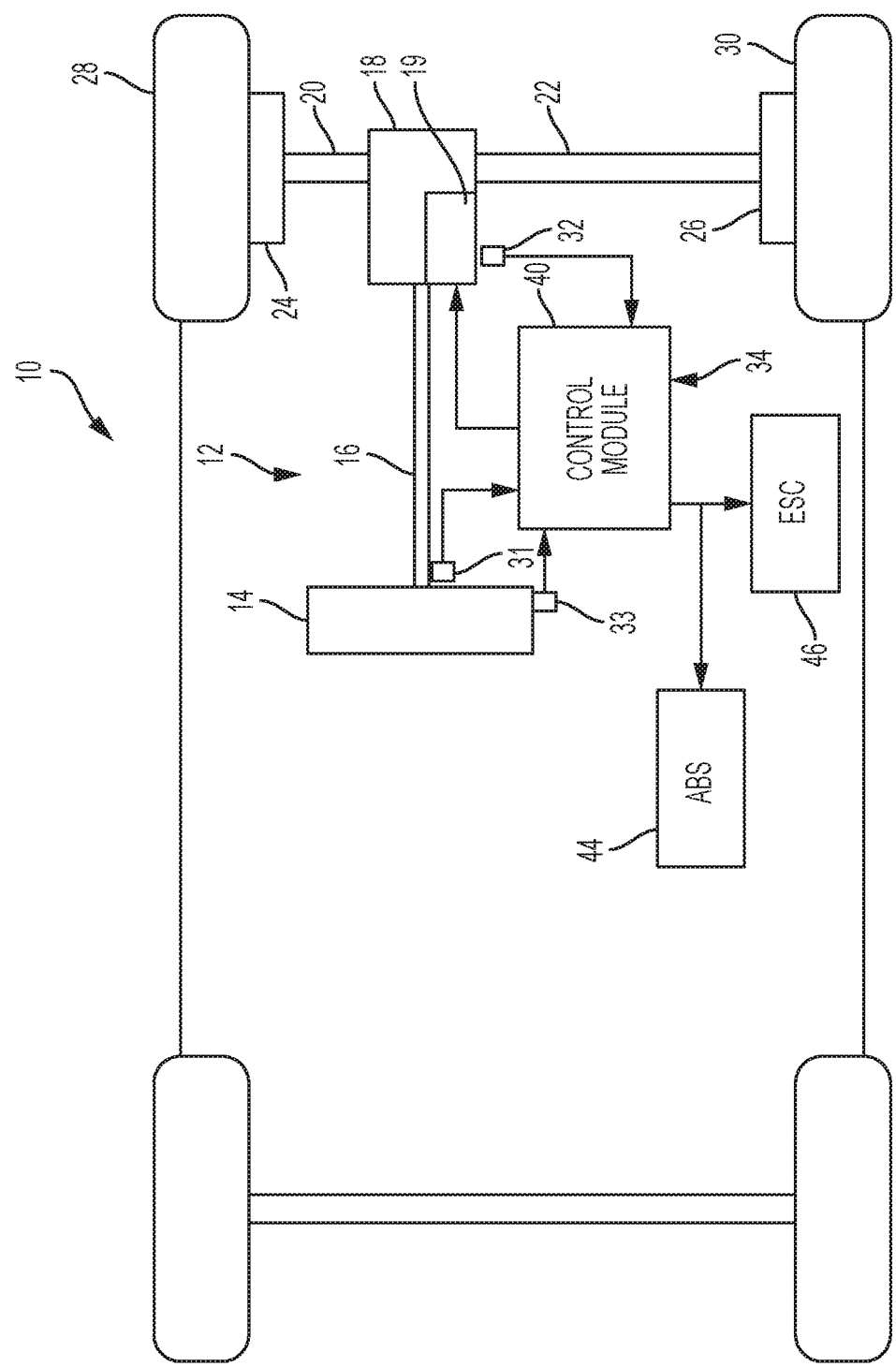
FIG. 3 is an exemplary embodiment of a vehicle including a steering system.

Referring now to the Figures, where the technical solutions will be described with reference to specific embodiments, without limiting same, FIG. 3 is an exemplary embodiment of a vehicle 10 including a steering system 12. In various embodiments, the steering system 12 includes a handwheel 14 coupled to a steering shaft system 16 which includes steering column, intermediate shaft, & the necessary joints. In one exemplary embodiment, the steering system 12 is an EPS system that further includes a steering assist unit 18 that couples to the steering shaft system 16 of the steering system 12, and to tie rods 20, 22 of the vehicle 10. Alternatively, steering assist unit 18 may be coupling the upper portion of the steering shaft system 16 with the lower portion of that system. The steering assist unit 18 includes, for example, a rack and pinion steering mechanism (not shown) that may be coupled through the steering shaft system 16 to a steering actuator motor 19 and gearing. During operation, as a vehicle operator turns the handwheel 14, the steering actuator motor 19 provides the assistance to move the tie rods 20, 22 that in turn moves steering knuckles 24, 26, respectively, coupled to roadway wheels 28, 30, respectively of the vehicle 10.

As shown in FIG. 3, the vehicle 10 further includes various sensors 31, 32, 33 that detect and measure observable conditions of the steering system 12 and/or of the vehicle 10. The sensors 31, 32, 33 generate signals based on the measured conditions. In one example, the sensor 31 is a torque sensor that senses an input driver handwheel torque (HWT) applied to the handwheel 14 by the operator of the vehicle 10. The torque sensor generates a driver torque signal based thereon. In another example, the sensor 32 is a motor angle and speed sensor that senses a rotational angle as well as a rotational speed of the steering actuator motor 19. In yet another example, the sensor 33 is a handwheel position sensor that senses a position of the handwheel 14. The sensor 33 generates a handwheel position signal based thereon.

A control module 40 receives the one or more sensor signals input from sensors 31, 32, 33, and may receive other inputs, such as a vehicle speed signal 34. The control module 40 generates a command signal to control the steering actuator motor 19 of the steering system 12 based on one or more of the inputs and further based on the steering control systems and methods of the present disclosure. Communication with the other components of the vehicle 10, such as an ABS 44, an ESC system 46, and other systems (not depicted), can be performed using, for example, a controller area network (CAN) bus or other vehicle network known in the art to exchange signals such as the vehicle speed signal 34.

In case of the ADAS vehicles, as a human driver or operator of the vehicle 10 becomes less involved with vehicle (steering) control, the added human sense of failure detection is also displaced. For electro-mechanical systems like the EPS 12, the reliance on the driver's perceptions as a detection mechanism (such as noise) prior to failure is leveraged during the design phase of the EPS 12 to classify failure mode severity. A steering failure of lash between two components can be detected by feel (or noise) and the EPS 12 is taken for service by the driver prior to continued use that can lead to a catastrophic failure. The lash failure condition is one in which the steering wheel may be turned through some part of a revolution without associated movement of the front wheels.

The technical solutions described herein facilitates lash detection startup diagnostic, which in case of ADAS vehicles where driver perception, such as tactile feel, sight, etc. (EPS steering lash in specific) is no longer available, such as in an ADAS vehicle operating in SAE Level 3+ use case.

Figure 4:
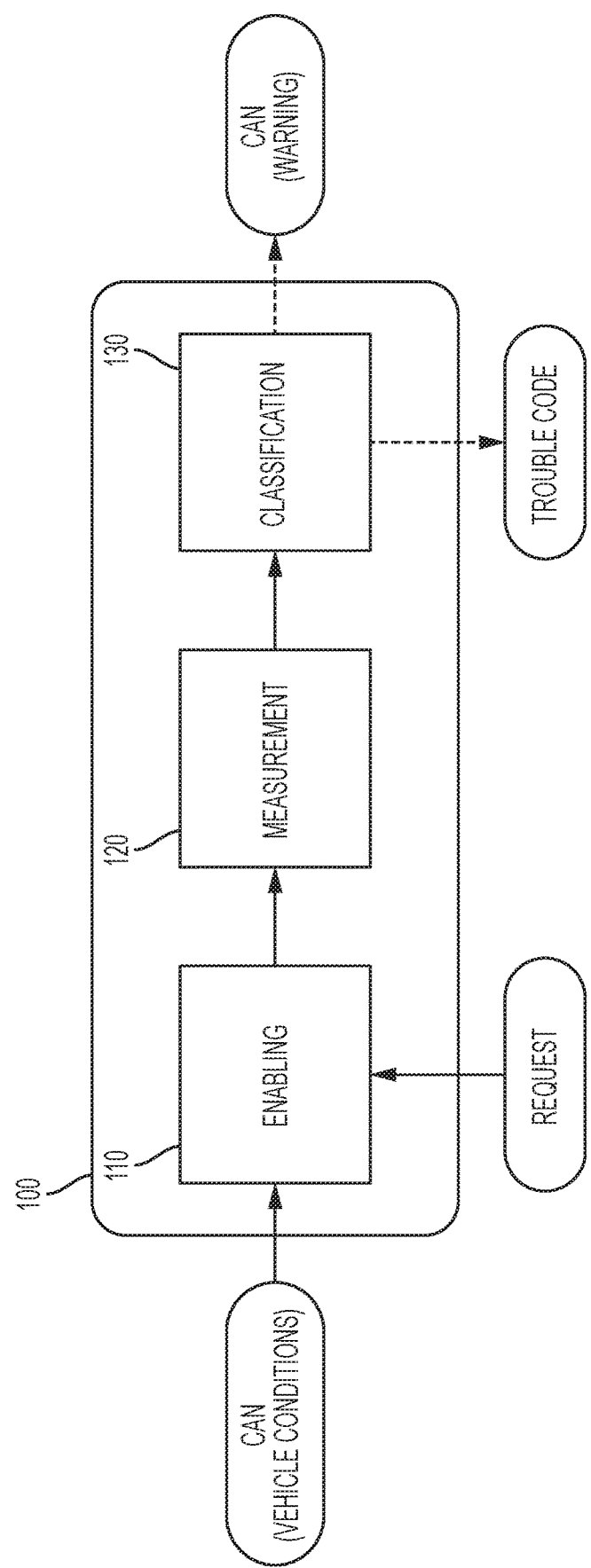
FIG. 4 illustrates an example block diagram and operational flow of a lash detection module according to one or more embodiments.

FIG. 4 illustrates an example block diagram and operational flow of a lash detection module according to one or more embodiments. An example lash detection module 100, as depicted, can include an enabling module 110, a measurement module 120, and a classification module 130, among other components. It is understood that in other examples, the lash detection module 100 may include different, additional, or fewer modules, for example, which may combine the operation(s) of the depicted modules in a different manner.

In one or more examples, the lash detection startup diagnostic is executed by the control module 40 of the EPS 12, or any other ECU of the vehicle 10. Further, the one or more modules of lash detection startup diagnostic may include computer executable instructions. Alternatively, or in addition, the one or more modules of the lash detection startup diagnostic include electronic circuitry such as ASIC, FPGA, and the like. The one or more modules can depict a 'phase' in a method that is executed by the control module 40 to implement the lash detection, in one or more examples.

In one or more examples, the lash detection startup diagnostic is executed during the initialization routine of the ADAS vehicle 10, and all phases of operation are completed in a static (or stationary) vehicle environment. The initialization routine, for example is ignition of the vehicle 10, at which time the lash diagnostic method is executed/implemented to determine if the one or more mechanical components of the vehicle 10 have developed a lash condition. In one or more examples, the lash detection startup diagnostic facilitates a dynamic response shift from the EPS 12.

The enabling module 110 executes an enabling phase of the lash detection. The enabling phase facilitates initiating the lash detection startup diagnostic only in specific restricted conditions. This is because, during the lash detection, the measurement module 120 may create an aggressive AC response of the EPS 12 during runtime. Accordingly, the enabling module 110 keeps the trigger that initiates the operation/execution of the measurement module 120 unavailable when conditions do not match the predetermined specific restricted conditions. In one or more examples, the enabling module 110 keeps the initiation of the measurement module 120 protected behind one or more secure diagnostics, which include rationality checks against the vehicle conditions and only unlocks/enables the triggering of the measurement module 120 if the predetermined conditions are validated. The predetermined conditions are validated to determine that the vehicle 10 is stationary, for example, by checking that the vehicle speed=0, or roadwheel speed=0, and the like, or a combination thereof. It is understood that the conditions may be different, or include additional or fewer checks in other examples. If all security measures are passed, the lash detection diagnostic is initiated by commanding the measurement module 120 to operate.

The measurement module 120, in one or more examples, sends a haptic call for motor torque at different frequencies to the EPS 12. For example, the measurement module 120 performs a frequency sweep of the EPS motor torque to achieve at or near saturation of a handwheel torque sensor (due to inertial effects of the EPS 12). A predetermined input torque value is applied to the handwheel 14 such that the magnitude provides the strongest inputs for the lash diagnostic. For example, input parameters for the frequency range and amplitude for the sweep of 10 to 25 hertz and 0.4 to 0.6 motor newton meters respectively. These parameters are calibratable and are tailored per application. The predetermined input values are configured such that critical inputs that would trigger resonance of the EPS 12 during operation of the measurement module 120 are protected. The measurements from the sensors of the steering system 12 are recorded based on predetermined input values being applied by the measurement module 120.

The classification module 130 analyzes the measured outputs from the sensors and classifies the results. For example, the analysis uses a transfer function of the commanded motor torque against the measured handwheel torque in a specific frequency range. If a lash condition is present within the EPS 12, occurrence of one or more conditions are detected based on the measured outputs. The classification module determines presence of the lash condition if the maximum magnitude of the transfer function occurs at a different frequency than a predetermined value. The maximum magnitude of the transfer function may change in the EPS 12 with lash vs the EPS 12 without the lash condition. Alternatively, or in addition, the classification module 130 determines the presence of the lash condition if the decay rate (roll off) of the magnitude (as the frequency increases) does not match a predetermined value. The decay rate changes in the EPS 12 system with lash vs the EPS 12 without the lash condition.

Figure 5:
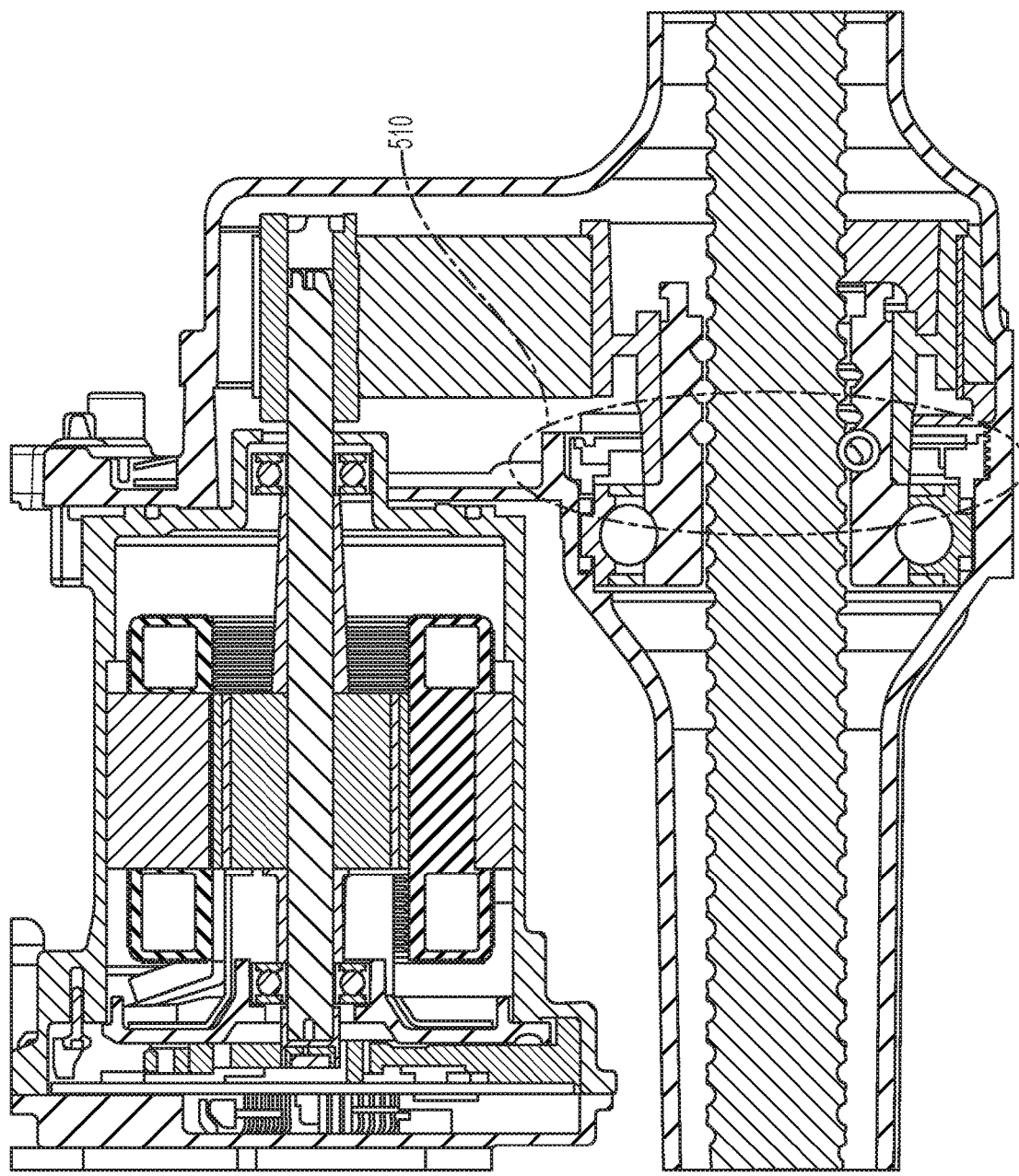
FIG. 5 depicts an example of lash condition according to one or more embodiments.

FIG. 5 depicts an example of lash condition according to one or more embodiments. In the depicted example, the lash condition is observed as a response shift when a large ball nut retainer 510 is incrementally loosened in a rack based EPS 12. FIG. 5 depicts a cross section of an EPS assist unit 18 with the retainer 510 identified. As the lash condition in the retainer 510 increases, if a common set of frequency check points are repeatedly compared against each other, the rate of the decrease in the magnitude of frequency response changes.

Figure 6:
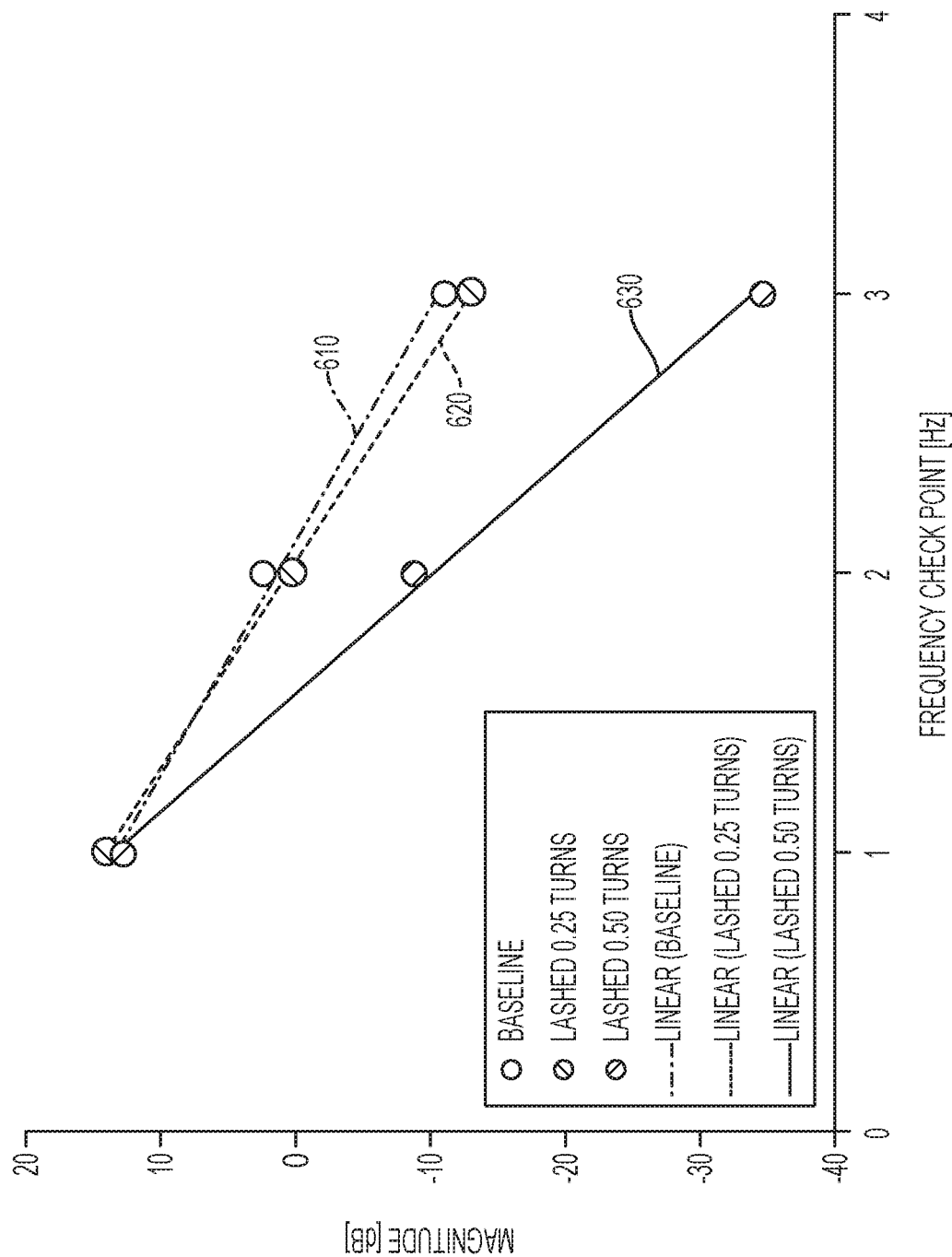
FIG. 6 depicts a plot that compares a system magnitude decay rate in different lash conditions in an EPS according to one or more embodiments.

FIG. 6 depicts a plot that compares a system magnitude decay rate in different lash conditions in an EPS according to one or more embodiments. Particularly, in the example plot depicted, the lash condition is the one in the large ball nut retainer 510, however, in other examples similar plots can be computed for different lash conditions. FIG. 6 depicts a baseline plot 610, a first lash condition plot 620, and a second lash condition plot 630.

To generate the plots 610, 620, and 630, at multiple frequency check points, corresponding input commands are applied to the motor 19. An input command at a particular frequency checkpoint has a predetermined frequency and magnitude. Corresponding output magnitude is measured using the sensor and the input command frequency and the measured output magnitude are plotted in each of the plots 610, 620, and 630.

A slope of the curve formed by the magnitudes that are measured at the different frequency checkpoints provides the rate of roll-off or decay of the system response. Each of the curves 610, 620, and 630, provides the rate of roll-off at a corresponding lash condition. For example, the measurements represented by the curve 610 are taken when there is no lash condition, the curve 620 is when the lash condition is a predetermined first incremental level, for example, 0.2 turns, and the curve 630 is when the lash condition is at a predetermined second incremental level, for example, 0.9 turns. As can be seen, the rate of roll off can be used as a distinguishing criterion to identify if a lash condition exists in the EPS 12. As depicted in FIG. 6, the relationship is observed to be linear. Accordingly, the lash detection module 100 determines that a lash condition exists when the slope of the drop-off is greater than a predetermined decay rate threshold. In other words, the lash detection module 100 detects a lash condition using the decay rate (roll off) of the magnitude (as the frequency increases) changes (system with lash vs one without) in the measured outputs from the sensors in response to inputting the predetermined commands for a frequency sweep.

In one or more examples, instead of using the decay rate of the magnitude as the factor for detecting presence of a lash condition, the lash detection module 100 uses a resonance peak shift with respect to frequency to detect presence of the lash condition. For example, the resonance peak shift is detected if the maximum magnitude of the transfer function occurs at a different frequency in a system with lash vs one without. Accordingly, in this case, the maximum magnitude is observed at a first frequency in case there is no lash condition, and the maximum magnitude is observed at a second frequency in case the lash condition exists. The lash detection module 100 detects the presence of the lash condition by comparing the frequency at which maximum magnitude is observed with the predetermined frequency for the maximum magnitude when the lash condition was not present. If the observed frequency for the maximum magnitude is different from the predetermined frequency, the lash detection module 100 concludes that a lash condition exists.

In one or more examples, the lash detection includes inputting multiple sets of commands and measuring corresponding sensor outputs for detecting a lash condition in multiple components of the EPS 12, a particular set of commands corresponding to a particular component. In other words, in case five different components of the EPS 12 are to be tested to determine presence of a lash condition, five respective sets of input commands are provided and the corresponding sensor outputs are analyzed. In one or more examples, each component may have a corresponding transfer function that is used for the analysis.

FIG. 7 depicts a flowchart of an example method for lash detection in an EPS according to one or more embodiments. The method includes receiving a command to initialize the lash detection, at 710. The lash detection module 100 enables the measurement module 120 and analysis module 130 if the enablement module 110 indicates that the startup conditions are satisfied, at 720 and 730. If the startup conditions are not met, the lash detection is stopped. This is because lash detection can create an aggressive AC response of the EPS 12 during runtime, which can be a hazardous situation. Accordingly, by checking if the startup conditions are met, the lash detection module 100 prevents the hazardous situation from occurring.

The startup conditions can include determining that the vehicle 10 is stationary and not being driven. For example, the startup conditions can include checking vehicle speed (=0), wheel speed (=0), gear position (=park), or any other such condition. The conditions can be checked by receiving one or more values/status of the one or more parameters to check via a vehicle networks, such as a controller area network (CAN), or any other network.

Once, enabled, the lash detection includes selecting which component to test for a lash condition, at 740. For example, the lash detection module 100 can detect presence of a lash condition in different components of the EPS 12. The lash detection module 100 selects a first component from a list of components to be tested for presence of lash condition. The method further includes generating and applying a set of input commands to test the selected component, at 750. The input commands excite the component of the EPS 12 resulting in the EPS 12 generating corresponding EPS signals, such as handwheel torque or handwheel displacement. In one or more examples, the input commands are applied to a motor control system of the EPS 12, the motor control system controlling the motor 19. The input commands may be specific for the selected component. The input commands can be motor torque commands that cause the motor 19 of the EPS 12 to generate torque in response and corresponding to the commands. The set of input commands includes a signal that is provided at different predetermined frequencies and different amplitudes. In one or more examples, the frequencies and amplitudes are based on the component being tested and the sensor being used to measure the corresponding output(s). In one or more examples, the input commands can be represented as sine waves of motor torque commands.

Alternatively, in one or more examples, the input commands are motor position commands that cause the motor 19 to change a position/be displaced corresponding to the input commands. The set of input commands includes a signal that is provided at different predetermined frequencies and different amplitudes. In one or more examples, the frequencies and amplitudes are based on the component being tested and the sensor being used to measure the corresponding output (s). In one or more examples, the input commands can be represented as sine waves of motor position commands.

The method further includes measuring sensor outputs corresponding to the input commands, at 760. Depending on what the input commands used are, the outputs that are measured are either handwheel torque or handwheel position or other EPS sensors. The handwheel torque is measured using a torque sensor that measures how much torque was generated when the input commands were applied to the motor 19. Alternatively, in case the input commands are position commands, the position of the handwheel 14 is measured in response to the input commands being applied.

The measured outputs are further analyzed to determine presence of lash condition in the selected component, at 770. The analysis uses a transfer function of the commanded motor torque/position against the measured handwheel torque/position in a specific frequency range. The transfer function results provide a rate of roll off of the system response and/or a resonance peak. A common set of frequency check points are repeatedly compared against each other. As lash increases, the rate of the roll off changes. In one or more examples, when the slope of this drop-off is greater than a decay rate threshold, the lash detection module 100 determines that the selected component has a lash condition.

Alternatively, if the lash detection module 100 uses the resonance peak as the factor to determine presence of lash condition, the lash detection module 100 compares the frequency at which maximum magnitude of the output is observed with a predetermined frequency at which the maximum magnitude associated with an absence of lash condition. If the frequency has changed more than a predetermined threshold value, the lash detection module 100 determines the presence of lash condition.

If the lash condition is present based on the analysis, the lash detection module generates a corresponding notification, at 780 and 785. The notification can include providing a diagnosis code and/or a driver feedback, such as via a driver-vehicle interactive unit of the vehicle 10, and the like, or a combination thereof.

The method further includes, checking if any other component is to be tested for presence of lash condition, at 790. This check can be performed regardless of whether lash condition was detected in the component that is being presently tested. If another component is to be tested, the method repeats the operations by selecting a next component to test for lash condition.

The technical solutions described herein facilitate lash detection startup diagnostic according to one or more embodiments. The lash detection is detected by applying predetermined input commands, such as motor torque/motor position commands to an EPS system at a predetermined frequency according to a clock. The lash detection is determined by analyzing measured output of the handwheel torque/position. For example, the analysis uses a transfer function of the commanded motor torque against the measured handwheel torque in a specific frequency range. When lash is present within the EPS, at least one of the following changes occur. The maximum magnitude of the transfer function occurs at a different frequency (system with lash vs one without). Alternatively, or in addition, the decay rate (roll off) of the magnitude (as the frequency increases) changes (system with lash vs one without). In one or more examples, the technical solutions computes the slope, intercept, and other measurements of the observed sensor signal to determine if the lash condition exists.

The technical solutions herein facilitate automatically detecting if a lash condition is present in a steering system, without human operator, and without relying on noise or feel by the human operator.

The technical solutions herein facilitate automatic lash detection in a steering system replacing the functionality of driver observed steering lash detection. The driver observed lash detection relies on noise and feel during operation of the steering system. The technical solutions described herein facilitate lash detection in case of advanced driver assistance-system (ADAS) vehicle which operate without a driver, such as in an automated manner Thus, the technical solutions address the technical challenge of detecting a lash failure condition in the steering system in case of automated vehicles.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession, in fact, may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

While the technical solutions are described in detail in connection with only a limited number of embodiments, it should be readily understood that the technical solutions are not limited to such disclosed embodiments. Rather, the technical solutions can be modified to incorporate any number of variations, alterations, substitutions, or equivalent arrangements not heretofore described, but which are commensurate with the spirit and scope of the technical solutions. Additionally, while various embodiments of the technical solutions have been described, it is to be understood that aspects of the technical solutions may include only some of the described embodiments. Accordingly, the technical solutions are not to be seen as limited by the foregoing description.

What is claimed:

1. A method for lash detection diagnostic in a steering system, the method comprising:
   generating, by a controller, an excitation motor command;
   applying, by the controller, the excitation motor command to a motor control system, wherein the motor control system generates torque in response to the excitation motor command;
   measuring, by the controller, a sensor signal generated in response to the excitation motor command, the sensor signal representing the torque generated by the motor control system;
   using, by the controller, a transfer function of excitation motor command to determine a decay rate of a change in magnitude of the signal at a plurality of frequencies; and
   diagnosing, by the controller, that the steering system has a lash condition based on the decay rate exceeding a predetermined threshold.

2. The method of claim 1, wherein the excitation motor command comprises a plurality of motor commands having a respective frequency and magnitude.

3. The method of claim 2, wherein the sensor signal comprises a corresponding plurality of handwheel signals measured by one or more sensors.

4. The method of claim 1, wherein the excitation motor command comprises one or more motor torque command, and the sensor signal comprises one or more corresponding handwheel torque measurements.

5. The method of claim 1, wherein the excitation motor command comprises motor position command, and the sensor signal comprises one or more corresponding handwheel position measurements.

6. The method of claim 1, further comprises:
   selecting, by the controller, a component of the steering system to test for presence of lash condition, wherein the excitation motor command is corresponding to the selected component.

7. The method of claim 1, wherein the excitation motor command is a first motor excitation command comprising a first plurality of motor signals having frequencies from a first range, and wherein the first motor excitation command is used to diagnose a first component of the steering system, and the method further comprises:
   diagnosing a second component of the steering system using a second motor excitation command, the second motor excitation command comprising a second plurality of motor signals having frequencies from a second range.

8. The method of claim 1, wherein the method is initiated at vehicle startup.

9. The method of claim 1, wherein the steering system is part of an automated vehicle.

10. A steering system comprising:
    a motor control system; and
    a lash detection module configured to detect presence of a lash condition in the steering system, detecting the lash condition comprises:
    generating an excitation motor command;
    applying the excitation motor command to a motor control system, wherein the motor control system generates torque in response to the excitation motor command;
    measuring a sensor signal generated in response to the excitation motor command, the sensor signal representing the torque generated by the motor control system;
    using a transfer function of the excitation motor command to determine a decay rate of a change in magnitude of the sensor signal at a plurality of frequencies; and
    diagnosing that the steering system has a lash condition based on the decay rate exceeding a predetermined threshold.

11. The steering system of claim 10, wherein the excitation motor command comprises a plurality of motor commands having a respective frequency and magnitude.

12. The steering system of claim 10, wherein the excitation motor command comprises one or more motor torque command, and the sensor signal comprises one or more corresponding handwheel torque measurements.

13. The steering system of claim 10, wherein the excitation motor command comprises motor position command, and the sensor signal comprises one or more corresponding handwheel position measurements.

14. The steering system of claim 10, wherein the excitation motor command is a first motor excitation command comprising a first plurality of motor signals having frequencies from a first range, and wherein the first motor excitation command is used to diagnose a first component of the steering system, and the detection of the lash condition further comprises:
    diagnosing a second component of the steering system using a second motor excitation command, the second motor excitation command comprising a second plurality of motor signals having frequencies from a second range.

15. The steering system of claim 10, wherein the lash detection module is configured to detect the presence of a lash condition at vehicle startup.

16. A lash detection system that detects presence of a lash condition in a steering system, the lash detection system comprising:
    a measurement module configured to:
    generate an excitation motor command;
    apply the excitation motor command to a motor control system of the steering system, wherein the motor control system generates torque in response to the excitation motor command; and measure a sensor signal generated in response to the excitation motor command, the sensor signal representing the torque generated by the motor control system; and a classification module configured to:

use a transfer function of the excitation motor command to determine a decay rate of a change in magnitude of the sensor signal at a plurality of frequencies; and diagnose that the steering system has a lash condition based on the decay rate exceeding a predetermined threshold.

17. The lash detection system of claim 16, wherein the excitation motor command comprises one or more motor torque command, and the sensor signal comprises one or more corresponding handwheel torque measurements.

18. The lash detection system of claim 16, wherein the excitation motor command comprises motor position command, and the sensor signal comprises one or more corresponding handwheel position measurements.

19. The lash detection system of claim 16, wherein the excitation motor command is a first motor excitation command comprising a first plurality of motor signals having frequencies from a first range, and wherein the first motor excitation command is used to diagnose a first component of the steering system, and the detection of the lash condition further comprises:

diagnosing a second component of the steering system using a second motor excitation command, the second motor excitation command comprising a second plurality of motor signals having frequencies from a second range.

20. The lash detection system of claim 16, wherein the lash detection system is configured to detect the presence of a lash condition at vehicle startup.

\* \* \* \* \*